US011675688B2

(12) United States Patent
O'Neil

(10) Patent No.: US 11,675,688 B2
(45) Date of Patent: Jun. 13, 2023

(54) RUNNERS FOR OPTIMIZATION SOLVERS AND SIMULATORS

(71) Applicant: NEXTMV.IO INC., Wilmington, DE (US)

(72) Inventor: Ryan J. O'Neil, Portland, ME (US)

(73) Assignee: NEXTMV.IO INC., Wilmington, DE (US)

( * ) Notice: Subject to any disclaimer, the term of this patent is extended or adjusted under 35 U.S.C. 154(b) by 0 days.

(21) Appl. No.: 17/325,975

(22) Filed: May 20, 2021

(65) Prior Publication Data

US 2022/0374332 A1 Nov. 24, 2022

(51) Int. Cl.
*G06F 9/44* (2018.01)
*G06F 9/455* (2018.01)
*G06F 9/445* (2018.01)
*G06F 11/36* (2006.01)

(52) U.S. Cl.
CPC .................. *G06F 11/3664* (2013.01)

(58) Field of Classification Search
CPC ............ G06F 11/3664; G06F 16/2465; G06F 9/30003; G06F 16/9035; G06N 20/00; G06N 5/04
See application file for complete search history.

(56) References Cited

U.S. PATENT DOCUMENTS

| | | | | |
|---|---|---|---|---|
| 9,785,419 B2 * | 10/2017 | Stanfill | ............... | G06F 9/44505 |
| 10,713,151 B1 * | 7/2020 | Zinger | ............... | G06F 11/3684 |
| 10,871,950 B2 * | 12/2020 | De Smet | ............ | G06F 16/9024 |
| 11,055,639 B1 * | 7/2021 | Cay | ......................... | G06Q 10/04 |
| 11,169,798 B1 * | 11/2021 | Palmer | ............... | G06F 16/9574 |
| 2015/0026658 A1 * | 1/2015 | Jones | .................... | G06F 9/4488 717/108 |
| 2017/0351511 A1 * | 12/2017 | Bar-Or | ............... | G06F 16/2465 |
| 2018/0246801 A1 * | 8/2018 | Krauss | ................... | G06N 20/00 |
| 2020/0081934 A1 * | 3/2020 | Karwan | ............... | G06F 16/958 |

(Continued)

FOREIGN PATENT DOCUMENTS

| | | | | | |
|---|---|---|---|---|---|
| CN | 106575246 A | * | 4/2017 | ........... | G06F 9/5066 |
| CN | 110622139 A | * | 12/2019 | .............. | F24F 11/32 |

OTHER PUBLICATIONS

Quentin Cappart, Improving Optimization Bounds Using Machine Learning: Decision Diagrams Meet Deep Reinforcement Learning, 2019, pp. 1-9. https://arxiv.org/pdf/1809.03359.pdf (Year: 2019).*

(Continued)

*Primary Examiner* — Mongbao Nguyen
(74) *Attorney, Agent, or Firm* — Hickman Becker Bingham Ledesma LLP

(57) ABSTRACT

Technologies for creating and executing a runnable that includes a decision diagram (DD)-based optimization function are capable of configuring the runnable based on runnable options data passed by the client program to a runner function, creating an executable version of the configured runnable based on context data associated with the client program, using input data read from the data source, creating a decision model and executing the executable version of the configured runnable using the decision model, and writing output produced by the executing of the executable version of the configured runnable to the data source.

20 Claims, 6 Drawing Sheets

(56) References Cited

U.S. PATENT DOCUMENTS

| | | | | |
|---|---|---|---|---|
| 2020/0310768 A1* | 10/2020 | Zhang | ............ | G06F 8/43 |
| 2021/0132947 A1* | 5/2021 | John et al. | ............ | G06K 9/6272 |
| 2021/0149788 A1* | 5/2021 | Downie | ............ | G06F 11/3604 |
| 2021/0209099 A1* | 7/2021 | Marsden | ............ | G06N 7/005 |
| 2021/0350262 A1* | 11/2021 | Song | ............ | G06N 5/04 |
| 2022/0375572 A1* | 11/2022 | Altman | ............ | G16H 20/70 |

OTHER PUBLICATIONS

Krasimira Genova, A Prototype of a Web-based Decision Support System for Building Models and Solving Optimization and Decision Making Problems, 2011, pp. 167-171. https://dl.acm.org/doi/pdf/10.1145/2023607.2023636 (Year: 2011).*

Margarita Paz Castro, Optimization Methods based on Decision Diagrams for Constraint Programming, AI Planning, and Mathematical Programming, 2020, pp. 1-179. https://tidel.mie.utoronto.ca/pubs/Theses/Castro_Margarita_P_202011_PhD_thesis.pdf (Year: 2020).*

David Bergman, Discrete Optimization with Decision Diagrams, 2014, pp. 1-37. https://www.andrew.cmu.edu/user/vanhoeve/papers/discrete_opt_with_DDs.pdf (Year: 2014).*

Hooker, John, "Decision Diagrams for Discrete Optimization", ICAPS Tutorial, Jun. 2016, pp. 1-167.

Cire, Andre Augusto, "Decision Diagrams for Optimization", Carnegie Mellon University Tepper School of Business, Aug. 2014, pp. 1-189 Tepper School of Business, Aug. 2014, pp. 1-189.

* cited by examiner

RUNNERS FOR OPTIMIZATION SOLVERS AND SIMULATORS

TECHNICAL FIELD

A technical field to which the present disclosure relates is application programming interfaces and software development kits for state-based decision diagram optimization solvers and simulators.

BACKGROUND

In computing, an application programming interface (API) is an interface that specifies the software mechanism by which two different computer programs may communicate data and/or instructions. The API may include programming code and specifications for data exchange between the programs. For example, a calling program calls the API to request data and/or functionality provided by a called program. The API facilitates the transmission of the request to the called program and the return of data and/or functionality to the calling program.

A software development kit (SDK) is a collection of software development tools that can be used to create software applications using APIs and other pre-built components such as libraries and code samples.

DETAILED DESCRIPTION

Figure 1:
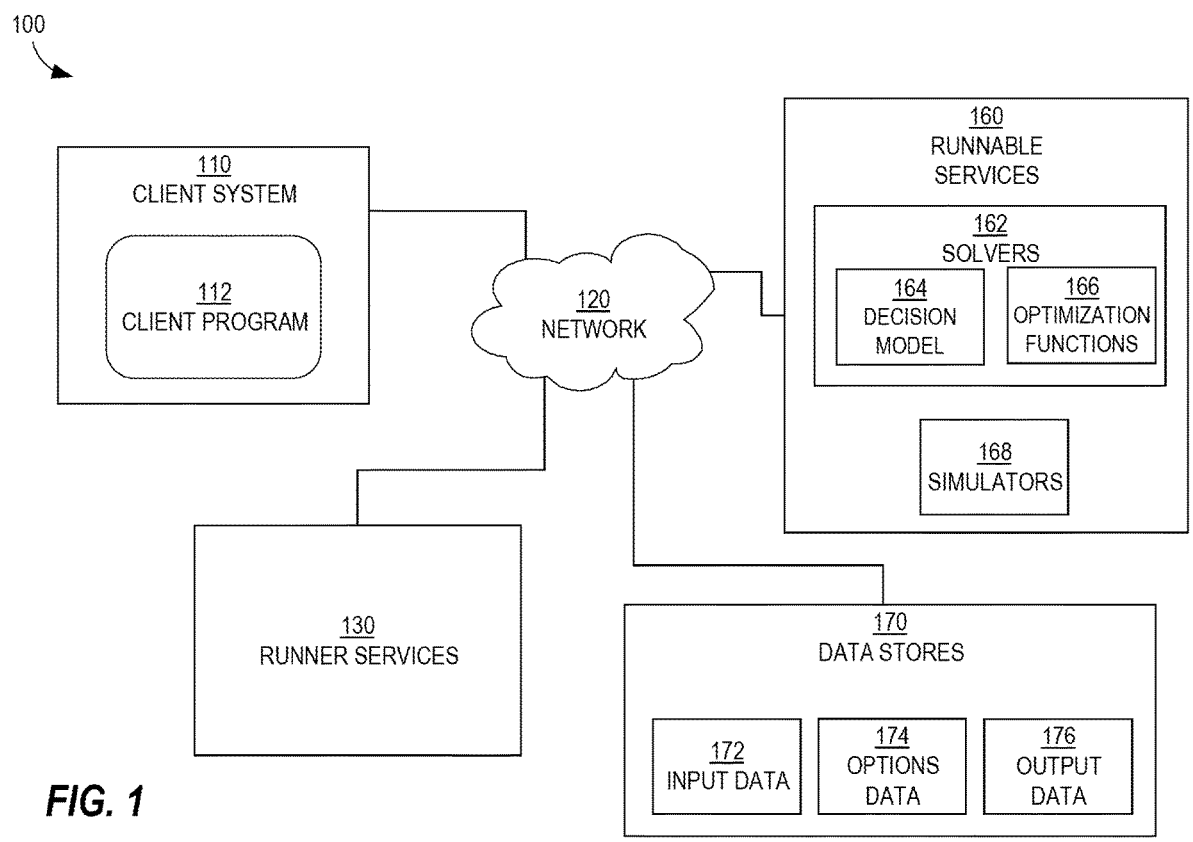
FIG. 1 is a block diagram illustrating at least one embodiment of a computing system in which aspects of the present disclosure may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

As used herein, a decision diagram (DD) may refer to a graph-based representation of a feasible solution set for an optimization problem. For instance, a DD may be described as a layered, directed, multi-graph diagram. Examples of optimization problems are routing, scheduling, and assignment problems, such as the classic vehicle routing problem and the knapsack problem. To solve a particular optimization problem, the problem is represented by an optimization function, which may be referred to as an objective function, which may change based on a transition from one state (node on the DD) to another state (another node on the DD), and a set of optimization parameters, also known as constraints or options.

Mathematical techniques such as dynamic programming are used to model the optimization function. The resulting modeling framework can then be used to generate a feasible solution set for a given set of inputs and options. An example of a feasible solution set is a set of routes, a set of assignments, or a set of schedules that satisfies the optimization parameters for a specified set of inputs.

Software tools known as solvers and simulators can help developers automate the optimization of routing, scheduling, and assignment decisions. A solver can automate decision modeling and optimization using a decision model to generate a feasible solution set for a particular set of options. More particularly, a solver includes an algorithm that searches a state space that is represented by a decision model. The model is a representation of a state space that can be searched by a solver to find a feasible solution. Solver as used herein may refer to a particular configuration of an optimization function with a given set of options, which ingests input data, creates a decision model based on the input data and the optimization function, and outputs a feasible solution set. A simulator enables a solver to be tested and validated over a variety of use cases and execution environments.

It has been a technical challenge for decision science-based optimization software tools to accommodate dynamic routing, scheduling, and assignment problems that are subject to fluid conditions over time. Examples of fluid conditions include but are not limited to constantly changing numbers and locations of vehicles, tasks, and task participants. Existing static decision models that cannot be easily or dynamically updated to reflect these and other fluid conditions produce sub-optimal solution sets.

One example of a decision modeling and optimization tool for developers, which includes a solver that is capable of modeling and solving dynamic optimization problems, is HOP, available from nextmv.io. An example of a simulation tool that includes simulation modeling interfaces and components that can test and validate decision models produced by HOP is DASH, also available from nextmv.io. As used herein, the term runnable may be used to refer individually or collectively to a solver, a simulator, or another software tool used in conjunction with a solver and/or a simulator, or another type of state-based DD optimization program.

Software developers responsible for maintaining a computer-implemented decision science-based modeling infrastructure often experience frustration with the process of testing and deploying DD optimization solvers. Syntactic differences, nested dependencies, and inconsistencies across execution environments and platforms can cause programs not to compile, or compiled code not to link, or linked code not to import, and so on. These deployment challenges are not unique to DD optimization but the complexities inherent in DD optimization tools can render these issues computationally intractable.

As described in more detail below, the disclosed technologies facilitate the creation and use of DD-based software tools such as state-based decision diagram optimization solvers and simulators. The disclosed technologies automate and simplify the testing and deployment of DD solvers and simulators across software execution environments and hardware platforms. For example, the disclosed technologies make it easy for developers to experiment with a DD solver and/or simulator in one execution environment and then deploy the DD solver and/or simulator in a different execution environment with confidence that it will operate as expected in the new environment. Examples of execution environments and hardware platforms, which may be referred to collectively as execution environments, across which the disclosed technologies may be enabled include but are not limited to: command line interface (CLI), hypertext transfer protocol (HTTP), AWS LAMBDA and S3, GOOGLE CLOUD, and MICROSOFT AZURE. Alternatively or in addition, as used herein, execution environment may refer to a platform-independent purpose of an execution environment, such as development, testing, continuous integration, and production environments.

Example Use Case

The disclosed technologies may be described with reference to an example use case of dynamic fleet routing. For example, the disclosed technologies may be described in the context of a DD solver and/or simulator that has been configured for the classic vehicle routing problem in which the solver, given a set of dynamically changing inputs such as routes, vehicles, delivery requests, and options, creates a dynamic, state-based decision model and uses the decision model to generate and dynamically update optimized route plans for vehicles delivering items to various locations. In the vehicle routing context, examples of configurable options include vehicle carrying capacity, duration of each stop, pickup and delivery precedence, and cost functions.

The following is a brief overview of a solver, using the state-based decision diagram solver as an example. This description is provided only to illustrate the context in which some embodiments of the disclosed technologies may be used, and not to limit the scope of this disclosure.

A generic implementation of a solver is an unconfigured solver, which may be referred to as a 'default' solver. A default solver provides one or more solver functions, e.g., for maximization, minimization, and satisfaction of decision models, and a solver interface. A default solver may allow for other, e.g., non-DD, solver types.

The default solver implements a solver interface that can be used to define a particular implementation of the default solver. The solver interface, and thus the definition of the particular solver implementation, is contained within the default solver. This approach provides the developer with flexibility to connect different solvers and runners together. Similarly, a simulator implements a simulator interface.

A DD solver is a type of solver that searches a diagram space for feasible states (e.g., solutions), and returns either a sequence of such states or a single state at the end of the search. The disclosed technologies may be used with pre-built solvers for maximization, minimization, and satisfaction which take in a root state and solver options. The solution returned by a DD solver may contain the current incumbent state as well as solver statistics pertaining to the time that incumbent is found. If the search is not interrupted, then the final solution may be an optimal state.

A solver may be created using pre-packaged modeling primitives that are needed for building and solving decision diagrams. Solvers may operate by maintaining a queue of decision diagrams to search. Each decision diagram may be constructed top-down into a restriction of exact nodes selected at each layer by a restrictor. The remaining nodes may be deferred to search later. Solver behavior and components may be controlled and overridden by setting the values of solver options. Examples of solver options include but are not limited to diagram reducer, diagram restrictor, diagram width, duration limit, nodes limit, solutions limit, queue depth, and random seed.

A solver searches the space of decision diagrams. The solver may start the search at a root state. The search function returns the current incumbent solution at a given state, as well as solver statistics, and a flag indicating if the search function may be called again to improve the incumbent solution or prove its optimality. Other functions can be called to return all solutions and search statistics found in the search or only the last solutions found.

The searchable space of decision diagrams may represent or be referred to as a decision model. Decision models may be represented and solved using states. A state is a collection of data that represents a system and a set of decisions or choices needed to be made with respect to that system. Some decision models are defined on a root state, which corresponds to the system before making decisions, and a transition function, which makes decisions and creates new states resulting from those decisions. States may be expected to satisfy the constraints of a system.

The root state is a state that is defined assuming no decisions have been made with respect to a current search. That is, a root state may contain decisions that have already been made from a previous optimization, or from a manual operator. For example, a root path may visit only the first node, and the domain of next nodes may contain all nodes that must be visited. A solver can be used to find all feasible paths through the model. A solution may be considered feasible if all nodes are included in the path, e.g., the domain of nodes left to visit is empty.

A solver may be instructed to terminate using one or more of the limits options, which can stop the solver after a time duration, or after a number of nodes, or after a number of incumbent solutions have been found.

Other Use Cases

The disclosed technologies are not limited to vehicle routing use cases, but can be applied to routing, or scheduling, or assignment optimization problems across a number of different use cases and industries, including information technology (IT) infrastructure management, e-commerce, and on-demand delivery. In the context of IT infrastructure management, the disclosed technologies can be applied to facilitate the generation and use of solvers and simulators for optimizing job scheduling and assignments of jobs to computing resources where the computing resources may be coming online and going offline dynamically.

In the e-commerce context, the disclosed technologies can facilitate the generation and use of solvers and simulators for optimizing inventory decision-making, such as determining optimal pricing or optimal delivery windows. In the on-demand delivery context, the disclosed technologies can facilitate the generation and use of solvers and simulators for optimizing delivery schedules, task assignments, and routes for couriers. A delivery task can involve the transport of any tangible, movable item. Couriers can be any type of transporter of tangible, movable items Examples of couriers include human couriers alone or operating any type of vehicle. Other examples of couriers include any type of vehicle operating autonomously or semi-autonomously, including motorized and non-motorized vehicles, as well as ground-based and aerial vehicles.

Additionally, the disclosed technologies are not limited to the particular examples of state-based decision modeling that are described but are applicable to alternative forms and designs.

Example Computing System

FIG. 1 illustrates a computing system in which embodiments of the features described in this document can be implemented. In the embodiment of FIG. 1, computing system 100 includes a client system 110, runner services 130, runnable services 160, and data stores 170.

Client system 110 includes at least one computing device, such as a personal computing device, a server, a mobile computing device, or a smart appliance. Client system 110 includes at least one software application, including a client program 112, installed on or accessible by a network to a computing device. Client program 112 is any type of application software system that may use functionality provided by runnable services 160. For example, portions of client program 112 may be implemented using or include a command line interface, an AWS LAMBDA interface, or another type of interface or front-end software tool implemented using any suitable software execution environment and/or hardware platform.

Client program 112 may be used to create and execute runnable services 160 using runner services 130 and data obtained from data stores 170. For example, client program 112 may include a mechanism for specifying a runnable service 160 to a runner service 130 along with input data 172 and options data 174, a mechanism for executing runner services 130 and runnable services 160, and mechanisms for reading data from data stores 170 and writing data to data stores 170.

Runner services 130 may be implemented as callable functions that create, configure, and execute runnable services 160 using the approaches described herein. Example implementations of the functions and components of runner services 130 are shown in the drawings that follow and are described in more detail below. Portions of runner services 130 may be part of or accessed by or through another system, such as client program 112.

Runnable services 160 include various types of runnable programs and associated data, which may be configured and executed by runner services. Examples of runnable services include but are not limited to solvers 162 and simulators 168. An individual solver 162 has an associated decision model 164 and an associated optimization function 166.

Examples of optimization functions 166 include optimization algorithms implemented in computer programming code, such as state-based DD minimizers, state-based DD maximizers, and state-based DD satisfiers. Example implementations of optimization functions 166 may be obtained from nextmv.io. Portions of runnable services 160 may be part of or accessed by or through another system, such as data stores 170.

A decision model 164 is created by the execution of an optimization function 166 on a particular set of input data 172 given a particular set of options data 174. An example of input data 172 is a set of possible routes through a geographic area. An example of options data 174 is a set of constraints for a vehicle routing problem. Decision model 164 may be created and deployed, into a production environment, for example, using runner services 130.

An example of a simulator 168 is a program that ingests one or more test data sets of input data and uses the test data set(s) to evaluate the performance of a solver 162 by creating a software simulation of the results that would be obtained given a particular feasible solution set output by the solver. For example, a solver 162 may produce a set of feasible routes for a given test data set. A simulator 168 may generate statistical predictions relating to the feasibility of the set of feasible routes produced by the solver under various conditions.

Data stores 170 includes at least one digital data store, which stores digital data including input data 172, options data 174, and output data 176. Portions of data stores 170 may be implemented using a combination of disk-based processing and in-memory processing. For example, portions of data stores 170 may be implemented as an in-memory data structure. The in-memory data structure may be configured according to a schema that is common across multiple different execution environments. In this way, the configuration of data stores 170 may simplify and facilitate the ingestion of input data across execution environments, thereby avoiding the need to create different, separate data ingestion programs for each individual execution environment.

Data stores 170 individually or collectively may reside on at least one persistent and/or volatile storage device that may reside within the same local network as at least one other device of computing system 100 and/or in a network that is remote relative to at least one other device of computing system 100. Thus, although depicted as being included in computing system 100, portions of data stores 170 may be part of computing system 100 or accessed by computing system 100 over a network, such as network 120.

While not specifically shown, it should be understood that any of client system 110, runner services 130, runnable services 160, and data stores 170 includes an interface embodied as computer programming code stored in computer memory that when executed causes a computing device to enable bidirectional communication between any of client system 110, runner services 130, runnable services 160, and data stores 170 using a communicative coupling mechanism. Examples of communicative coupling mechanisms include network interfaces, inter-process communication (IPC) interfaces and application program interfaces (APIs).

A client portion of runner services 130 may operate in client system 110, for example as a plugin or widget in a graphical user interface of a software application or as a web browser executing client program 112. In an embodiment, a web browser may transmit an HTTP request over a network (e.g., the Internet) in response to user input that is received through a user interface provided by the web application and displayed through the web browser. A server running runner services 130 may receive the input, perform at least one operation using the input, and return output using an HTTP response that the web browser receives and processes.

Each of client system 110, runner services 130, runnable services 160, and data stores 170 is implemented using at least one computing device that is communicatively coupled to electronic communications network 120. Runner services 130 may be bidirectionally communicatively coupled to any of client system 110, runnable services 160, and data stores 170 by network 120. Client system 110 as well as one or more different client systems (not shown) may be bidirectionally communicatively coupled to any of runner services 130, runnable services 160, and data stores 170.

The features and functionality of client system 110, runner services 130, runnable services 160, and data stores 170 are implemented using computer software, hardware, or software and hardware, and may include combinations of automated functionality, data structures, and digital data, which are represented schematically in the figures. Client system 110, runner services 130, runnable services 160, and data stores 170 are shown as separate elements in FIG. 1 for ease of discussion but the illustration is not meant to imply that separation of these elements is required. The illustrated systems and data stores (or their functionality) may be divided over any number of physical systems, including a single physical computer system, and can communicate with each other in any appropriate manner.

Network 120 may be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

It should be understood that computing system 100 is just one example of an implementation of the technologies disclosed herein. While the description may refer to FIG. 1 or to "system 100" for ease of discussion, other suitable configurations of hardware and software components may be used to implement the disclosed technologies. Likewise, the particular embodiments shown in the subsequent drawings and described below are provided only as examples, and this disclosure is not limited to these exemplary embodiments.

Example Runtime Flow

Figure 2:
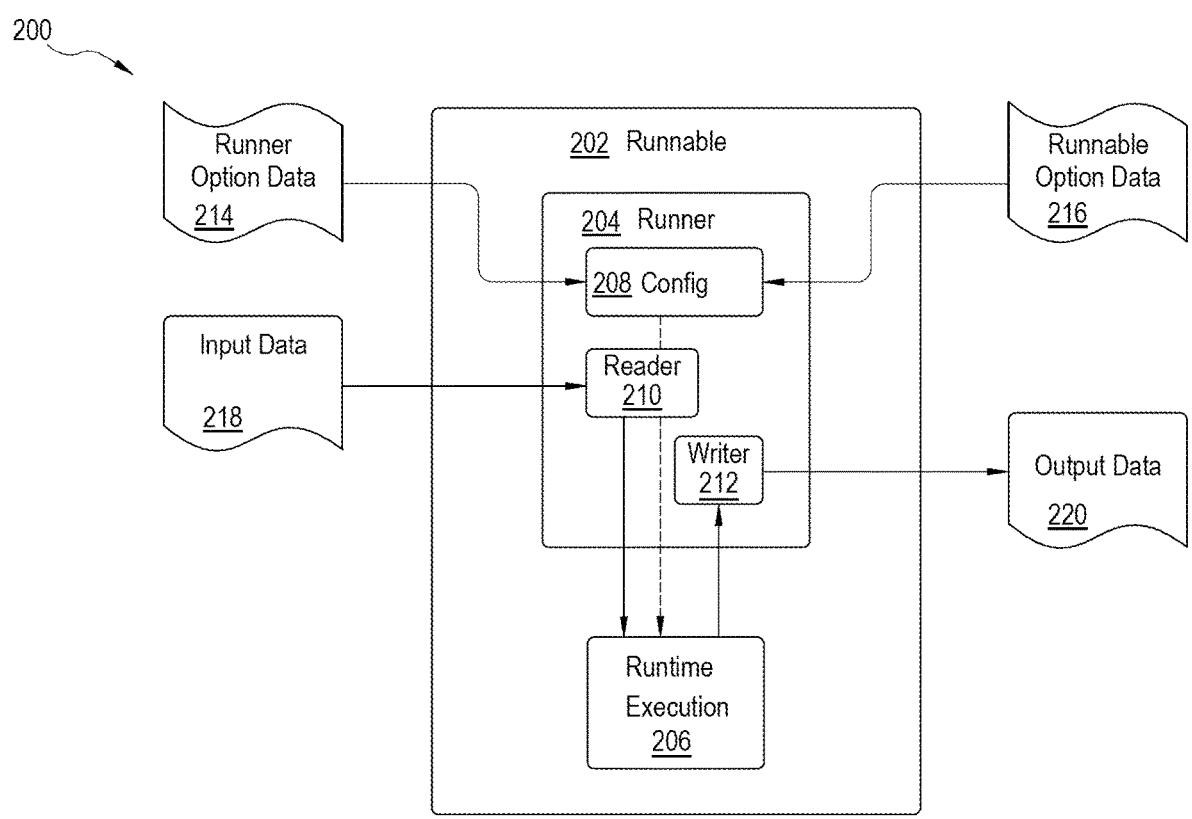
FIG. 2 is a flow diagram of a process that may be used to implement a portion of the computing system of FIG. 1.

FIG. 2 is a simplified flow diagram of an embodiment of operations and components of a computing system capable of performing aspects of the disclosed technologies. The operations of a flow 200 as shown in FIG. 2 can be implemented using processor-executable instructions that are stored in computer memory. For purposes of providing a clear example, the operations of FIG. 2 are described as performed by computing system 100, but other embodiments may use other systems, devices, or implemented techniques.

In flow 200, a runner 204 is called by a calling program such as client program 112. Runner 204 interacts with and creates an executable version of runnable 202. Runnable 202 is one of runnable services 160; e.g., a solver 162 or a simulator 168. Runner 204 is one of runner services 130. Runner option data 214 and runnable option data 216 are examples of options data 174. Runner option data 214 and/or runnable option data 216 may be implemented using, e.g., environment variables or command line flags or data files, e.g., JSON (JavaScript Object Notation) files, or strings (e.g., sequences of text characters). Input data 218 is an example of input data 172. For example, where runnable 202 is a solver, input data 172 is model input data, which is used to create a decision model. Output data 220 is an example of output data 176. For example, where runnable 202 is a solver, output data 220 is a set of feasible solutions.

Runner 204 configures and executes runnable 202. In doing so, runner 204 is designed to decouple the input/output processing for runnable 202 from the runtime program behavior of runnable 202. To do this, runner 204 is made up of computer programming code portions including a config 208, a reader 210, and a writer 212.

Config 208 reads runner options data 214 and configures runner 204 using runner option data 214. Config 208 also reads runnable option data 216 and configures runnable 202 using runnable option data 216. As a result, the configured runnable 202 is ready for runtime execution 206 by the configured runner 204 in response to the ingestion of input data 218 by reader 210.

Runner and runnable option data 214, 216 may be provided through, e.g., environment variables and/or command-line flags and/or data files and/or strings. Examples of runner option data 214 include but are not limited to specifications for how the runner will configure and execute the runnable, such as input data path (identifies the directory with input files), output data path (identifies the directory for storing output files), output solutions (identifies whether to output all or only the last solution). Examples of runnable option data 216 include but are not limited to specifications for how a runnable is to perform its task, e.g., for a solver, decision diagram width, decision diagram expansion limit.

In the implementation shown in FIG. 2, runner option data 214 is decoupled from runnable option data 216. In other implementations, runner option data 214 and runnable option data 216 are not decoupled. That is, in some implementations, runner option data 214 and runnable option data 216 may be grouped together and read from the same input.

Also, in some embodiments, runner and runnable option data 214, 216 are read into one or more data structures that each have an appropriately defined schema that is common across multiple execution environments.

Reader 210 reads input data 218 into a data structure. In an embodiment, input data 218 may be in the form of a JSON file and reader 210 may automatically parse the JSON file into an in-memory data structure having an appropriately-defined schema. An example of an appropriately-defined schema is a schema for a dynamic routing problem. An example of a schema for a dynamic routing problem may contain, for unassigned requests, request locations and estimated times of arrival (ETAs) for drivers to reach the locations of unassigned requests; and, for assigned requests, current locations of drivers or vehicles assigned to the requests and backlog data indicating the number of assigned but uncompleted requests for a given driver or vehicle). The schema may specify that location data is provided in longitude and latitude, for example.

The data structure populated as a result of reader 210 reading input data 218 is provided or made accessible to runtime execution 206 along with the configured runnable 202. The configured runnable 202 is configured according to runnable option data 216 by the configured runner 204. The configured runner 204 is configured according to runner option data 214.

Runtime execution 206 includes the creation and execution of an executable binary of the configured runnable 202, where the executable binary is created using the data structure containing the automatically-parsed input data 218 provided by reader 210. Runtime execution 206 outputs the results of execution of the executable binary of the configured runnable 202 to writer 212 using a data structure that has an appropriately-defined schema.

Writer 212 prepares output data 220 in a format that is compatible with or expected by the calling program, e.g., client program 112. For example, writer 212 may produce a JSON file containing output data 220. In this way, using intermediate input and output data structures, the input and output operations of runner 204 can be standardized across execution environments irrespective of the format in which input data 218 is received from the calling program and without regard for the format in which output data 220 is to be provided to the calling program. It should be noted that options data, such as runner options, solver options, or simulator options, may be handled using a data structure similar to the above-described manner. For example, runner and solver or simulator options may be read from one or more JSON files into an intermediate data structure and/or written from an intermediate data structure to one or more JSON files.

For example, runner 204 may be configured to read model input data from standard in and write solutions to standard out, in a command line execution environment. In an HTTP execution environment, runner 204 may be configured to read model input data from POST requests and to read option data from environment variables. In an AWS LAMBDA environment, runner 204 may be configured to read option data from environment variables and to read model input data from AWS LAMBDA. In an AWS LAMBDA environment with S3 triggers, runner 204 may be configured to read model input from an S3 input bucket and write output to an S3 output bucket, and to read option data from environment variables.

In some embodiments, the type of execution environment is parameterized. For example, an indicator of the target execution environment in which the runnable 202 is desired to be created, tested or deployed is passed to runner 204, e.g., as a part of runner option data 214. In these embodiments, runner 204 includes computer program code that implements logic for determining how to adapt the runner 204 to the target execution environment indicated by the execution type parameter.

It should be noted that adapting runner 204 to different execution environments does not change the inner workings of runnable 202, itself. For example, runner 204 may be adapted to different execution environments by specifying different path names at which input data or options may be found, without altering or affecting runnable 202. This is because the intermediate data structures used in the configuration and execution of runnable 202 are agnostic to or independent of the execution environments.

Example Runner Flow

Figure 3:
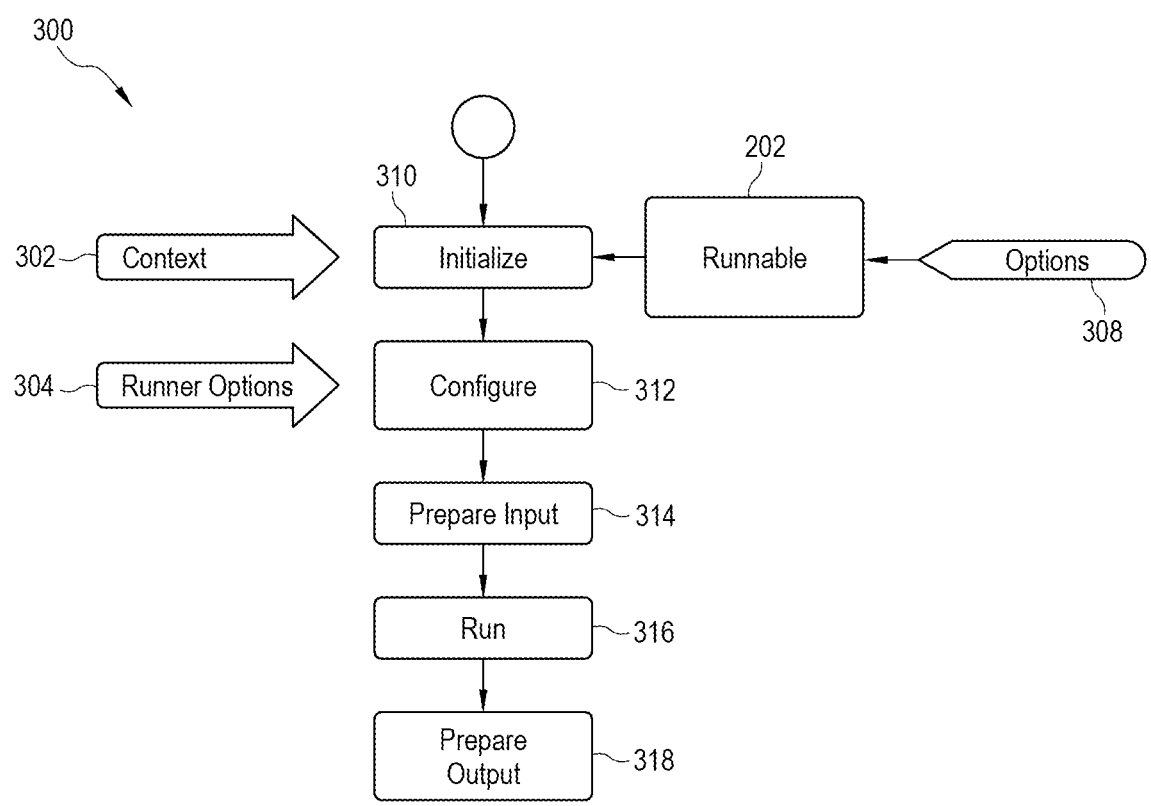
FIG. 3 is a flow diagram of a process that may be used to implement a portion of the computing system of FIG. 1.

FIG. 3 is a simplified flow diagram of an embodiment of operations that can be performed by at least one device of a computing system. The operations of a flow 300 as shown in FIG. 3 can be implemented using processor-executable instructions that are stored in computer memory. For purposes of providing a clear example, the operations of FIG. 3 are described as performed by computing system 100, but other embodiments may use other systems, devices, or implemented techniques.

In particular, FIG. 3 illustrates the operational phases of runner 204, in one implementation. In the implementation of FIG. 3, the operational phases of runner 204 include an initialize phase 310, a configure phase 312, a prepare input phase 314, a run phase 316, and a prepare output phase 318.

In the initialize phase 310, flow 300 instantiates the runner by reading in context data 302 and runnable 202. Context data 302 includes, for example, control data that defines how a solver or simulator program should execute. Alternatively or in addition, context data 302 includes configuration data, such as how long the solver or simulator program should run for (e.g., a number of iterations), the location from which the program should read input data (e.g., a file path or file system location), and the location to which the program should write output data. In this way, context data 302 may encompass a combination of runner options and solver options or simulator options.

In FIG. 3, runnable 202 is an intermediate interface that encapsulates runnable options 308 separate from the runner behavior. Runnable 202 is, for example, a solver or a simulator. Runnable options 308 are, for example, solver options or simulator options.

In the configure phase 312, flow 300 examines runner options data 304. Runner options data 304 includes, for example, runtime specifications, environment variables, and any other supported configuration methods (for example, headers for HTTP). Runner options data 304 can change the behavior of the runnable 202 and runner to, for example, stream the output (e.g., feasible solutions) as they are found or use a different diagram queue.

If configure phase 312 completes successfully, flow 300 proceeds to the prepare input phase 314. In prepare input phase 314, flow 300 prepares the input data by reading from the reader 210 (fetching from S3, for example).

After the input data is read from reader 210, flow 300 proceeds to run phase 316. In run phase 316, flow 300 executes the runnable (e.g., by running the solver or simulator). In run phase 316, a decision model is built into a binary executable, which reads input and writes solutions to output. The binary can be called directly to solve its associated decision model.

Output of the run phase 316 is prepared for the calling program by prepare output phase 318. In prepare output phase 318, the runner options data 304 may specify the form of output. For example, based on runner options data 304, prepare output phase 318 may stream the output or simply write the output bytes. An example of output that may be produced by prepare output phase 318, in one implementation in which runnable 202 is a solver, is a set of feasible solutions written in JSON bytes. An example of output that may be produced by prepare output phase 318, in one implementation in which runnable 202 is a simulator, is a list of output measures.

In some implementations, finer-grained control over the lifecycle of a runner can be achieved by instantiating the runner before executing. Also, in some implementations, a variadic options pattern may be introduced to allows full or partial initialization of a runner. For example, some runners are built on top of others and as a result, can override the behavior of the runners on top of which they are built. For example, a LAMBDA runner may be built for use in AWS LAMBDA. The LAMBDA runner can read input data from a request payload and write output to a response. A LAMBDA/S3 runner can be provided "on top" of the LAMBDA runner. The LAMBDA/S3 runner can override the input and output of the LAMBDA runner to instead read and write data from and to S3 buckets based on data in the request payload. This allows the runner architecture to handle large inputs and outputs in serverless environments.

Example Configure Flow

Figure 4:
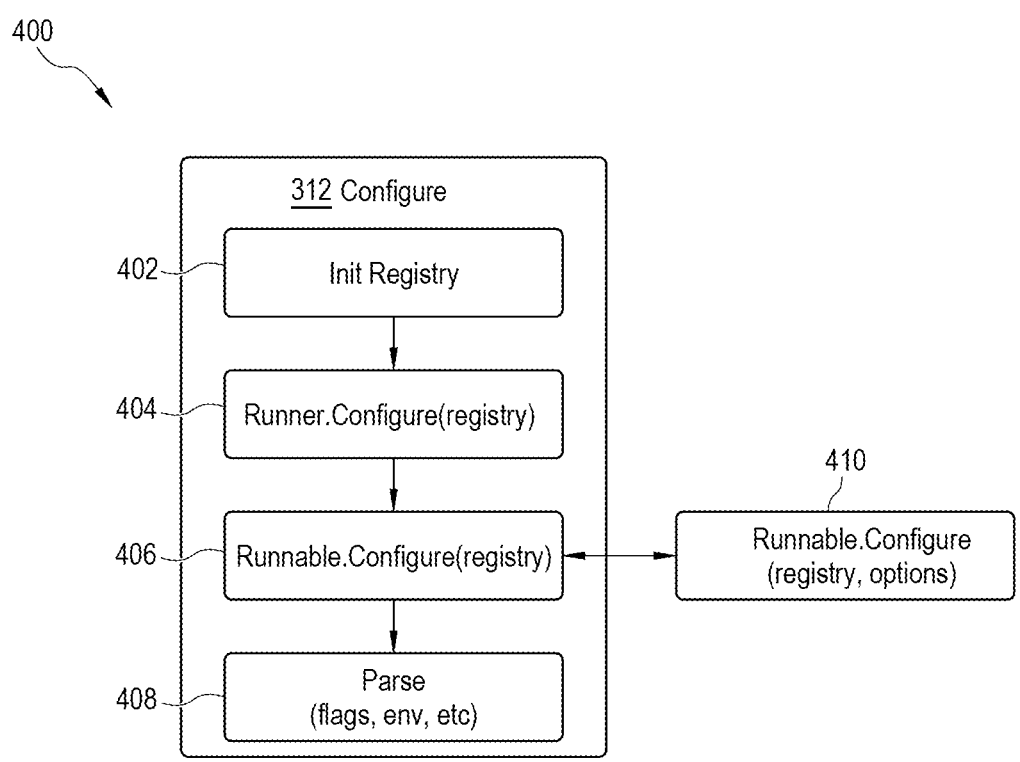
FIG. 4 is a flow diagram of a process that may be used to implement a portion of the computing system of FIG. 1

FIG. 4 is a flow diagram of a process that may be used to implement a portion of the computing system of FIG. 1. More specifically, flow 400 is an example of a process that may be used to implement the configure phase 312 of FIG. 3.

In flow 400, a registry interface is instantiated at operation 402. The registry interface allows the runner to, at operations 404, 406, 408, delegate the configuration of the runtime program behavior of the runnable prior to execution. Operations 404, 406, 408, 410 can be implemented as optional interfaces that superset other interfaces such as the runnable interface or can be added via context values. Flow 400 allows a runner to define its needed configuration, and allows a solver to add or override a configuration and specify that all parsing is to take place in one location (e.g., command line flags, environment variables, etc.).

For example, a solver may have a number of different interfaces that allow it to solve optimization problems across different implementations. These interfaces may include, for example, node queues, search algorithms, and node restriction and expansion algorithms. The solver may provide multiple different implementations of these interfaces, which are configurable through the solver options.

Similarly, a simulator may have a number of different interfaces for an event ledger, which make the event ledger configurable through the simulator options. Likewise, a solver such as a maximizer or minimizer may provide engine-specific interfaces, such as measures (which specify the cost of connecting two points), to make the engine configurable for different implementations. The various different interfaces may be pre-built and obtained from a library, for example, or a developer or user may supply its own specific implementations of those interfaces.

Since different implementations may require different data, the component registry allows a runner to instantiate arbitrary implementations of the required interfaces for solvers, simulators, and engines using a common schema using, for example, just JSON.

Example of Multiple Runners

Figure 5:
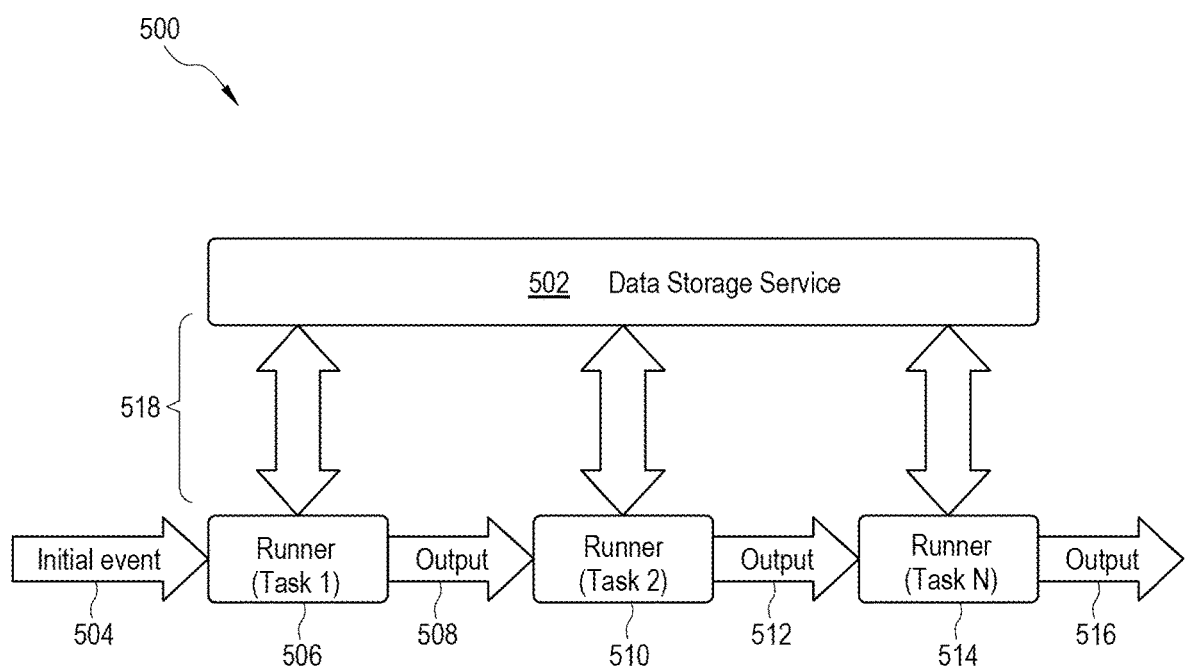
FIG. 5 is a flow diagram of a process that may be used to implement a portion of the computing system of FIG. 1.

FIG. 5 is a flow diagram of a process that may be used to implement a portion of the computing system of FIG. 1. More specifically, flow 500 is an example of a process that may be used to implement multiple different runners serially. An arrangement of runners such as shown in FIG. 5 may be useful, for example, for implementing a complex pipeline of decision modeling.

In flow 500, a decision modeling pipeline includes N runners 506, 510, 514, each configured to execute a runnable for a particular Task N, where N is a positive integer. Runners 506, 510, 514 are arranged serially so that the output of one runner is the input to the next runner. Each runner executes a different type of modeling task. For example, runner 506 may execute a runnable that performs clustering of input data, runner 510 may execute a runnable that performs routing optimization using the output of the clustering, and runner 514 may execute a runnable that performs time estimation optimization using the output of the route optimization. In another example, runner 506 may execute a runnable that runs a forecasting model; runner 510 may execute a runnable that executes a scheduling optimization model using the output of the forecasting model, and runner 514 may execute a runnable that performs business logic such as market management, driver recruitment, etc. using the output of the scheduling model.

In FIG. 5, flow 500 is initiated by an initial event 504, which is input to runner 506. Runner 506 executes its runnable for Task 1 and produces output 508. Runner 510 processes output 508 and executes its runnable for Task 2 produces output 512. Runner 514 processes output 512 and executes its runnable for Task N, and produces the final output 516.

Each runner 506, 510, 514 engages in input/output (I/O) operations via one or more I/O channels 518 and interfaces with data storage service 502, to read input data and options data and write output data via the I/O channel 518. Data storage service 502 may include one or more in-memory data structures.

In another implementation, runners are arranged in parallel so that each runner executes a runnable configured with a different objective function for the same task, using the same input data. For example, suppose there are five different possible objective functions for a routing optimization problem, and it is unknown which objective function will produce the optimal solution. A parallel, or concurrent, runner execution framework allows the same input data to be used by each of the runners executing different objective functions to produce respective sets of feasible solutions, and the framework may also provide an interface for performing AB testing on the models or otherwise evaluating and comparing the outputs of the parallel runners.

Example Hardware Architecture

According to one embodiment, the techniques described herein are implemented by at least one special-purpose computing device. The special-purpose computing device may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile computing devices, wearable devices, networking devices or any other device that incorporates hard-wired and/or program logic to implement the techniques.

Figure 6:
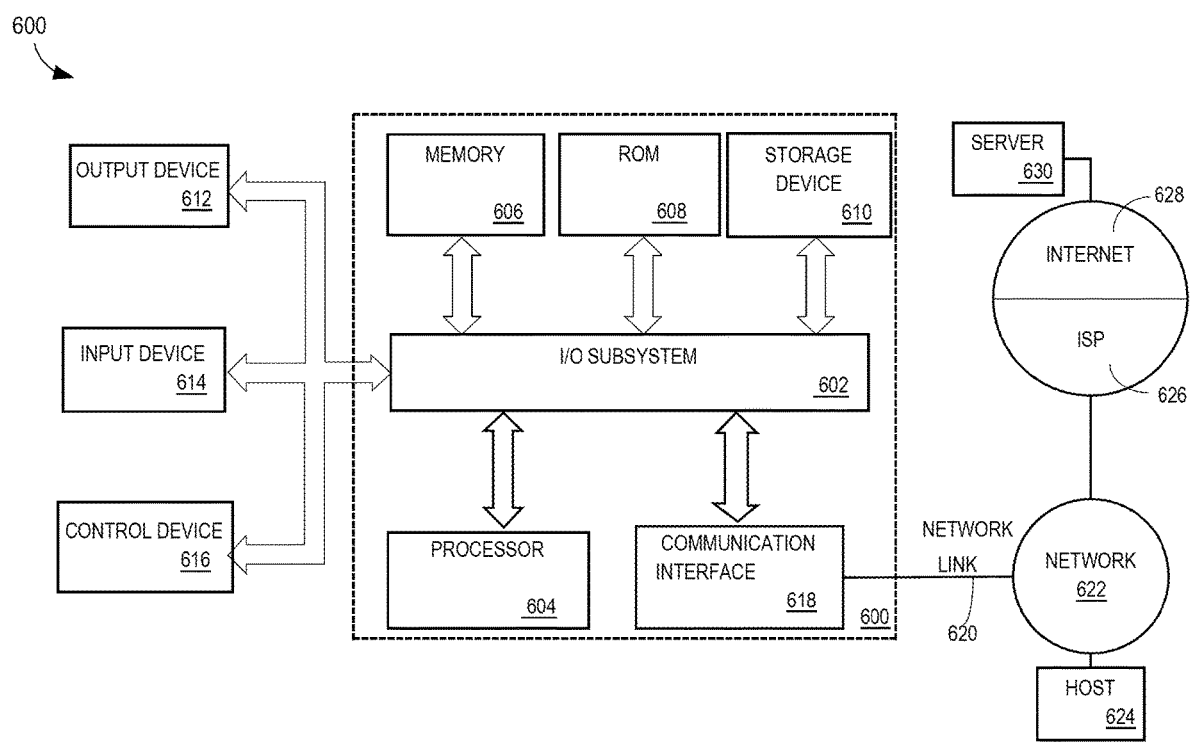
FIG. 6 is a block diagram illustrating an embodiment of a hardware system, which may be used to implement various aspects of the computing system of FIG. 1.

For example, FIG. 6 is a block diagram that illustrates a computer system 600 upon which an embodiment of the present invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory computer-readable storage media accessible to processor 604, render computer system 600 into a special-purpose machine that is customized to perform the operations specified in the instructions.

Computer system 600 and further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to an output device 612, such as a display, such as a liquid crystal display (LCD) or a touchscreen display, for displaying information to a computer user, or a speaker, a haptic device, or another form of output device. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, at least one ASIC or FPGA, firmware and/or program logic which in combination with the computer system causes or programs computer system 600 to be a special-purpose machine. According to one embodiment, the techniques herein are performed by computer system 600 in response to processor 604 executing at least one sequence of instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying at least one sequence of instruction to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated-services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through at least one network to other data devices. For example, network link 620 may provide a connection through local network 622 to a host computer 624 or to data equipment operated by an Internet Service Provider (ISP) 626. ISP 626 in turn provides data communication services through the world-wide packet data communication network commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

ADDITIONAL EXAMPLES

Illustrative examples of the technologies disclosed herein are provided below. An embodiment of the technologies may include any of the examples or a combination of the described below.

In an example 1, a method includes establishing a communicative coupling between a client program and a data source; using the communicative coupling, by a runner function called by the client program, (i) configuring a runnable based on runnable options data passed by the client program to the runner function, (ii) creating an executable version of the configured runnable based on context data associated with the client program, (iii) using input data read from the data source, creating a decision model and executing the executable version of the configured runnable using the decision model, and (iv) writing output produced by the executing of the executable version of the configured runnable to the data source; the runnable including a decision diagram (DD)-based optimization function.

An example 2 includes the subject matter of example 1, further including configuring the runner function based on runner options data passed by the client program to the runner function. An example 3 includes the subject matter of example 1 or example 2, further including reading the runnable options data into an in-memory data structure and passing the in-memory data structure to the runnable; the runnable options data including at least one command line flag or at least one environment variable or at least one data file or at least one string. An example 4 includes the subject matter of any of examples 1-3, further including reading the input data into an in-memory data structure configured according to a schema that is common across a plurality of execution environments. An example 5 includes the subject matter any of examples 1-4, further including parsing the context data to determine an execution environment and executing the executable version of the configured runnable in the execution environment. An example 6 includes the subject matter of any of examples 1-5, further including passing the output to a second runner function to be used as input to the second runner function. An example 7 includes the subject matter of any of examples 1-6, further including comparing the output to output of a second runner function executed concurrently with the runner function; the runner function and the second runner functions executing different runnables. An example 8 includes the subject matter of any of examples 1-7, the runnable including a state-based decision diagram optimization solver, the input data including decision model data, and the output including a subset of the decision model data including at least one feasible route, or at least one feasible assignment, or at least one feasible schedule. An example 9 includes the subject matter of any of examples 1-8, the runnable including a state-based minimizer, or a state-based maximizer, or a state-based satisfier. An example 10 includes the subject matter of any of examples 1-9, the runnable including a simulator for a state-based decision diagram optimization solver, the input data including decision model testing data and the output including at least one performance indicator for the state-based decision diagram optimization solver based on the decision model testing data.

In an example 11, a device includes at least one computer memory; the at least one computer memory including instructions that when executed by at least one processor are capable of causing the at least one processor to perform operations including: establishing a communicative coupling between a client program and a data source; using the communicative coupling, by a runner function called by the client program, (i) configuring a runnable based on runnable options data passed by the client program to the runner function, (ii) creating an executable version of the configured runnable based on context data associated with the client program, (iii) using input data read from the data source, creating a decision model and executing the executable version of the configured runnable using the decision model, and (iv) writing output produced by the executing of the executable version of the configured runnable to the data source; the runnable including a decision diagram (DD)-based optimization function.

An example 12 includes the subject matter of example 11, where the instructions, when executed by the at least one processor, are capable of causing the at least one processor to perform operations further including configuring the runner function based on runner options data passed by the client program to the runner function. An example 13 includes the subject matter of example 11 or example 12, where the instructions, when executed by the at least one processor, are capable of causing the at least one processor to perform operations further including reading the runnable options data into an in-memory data structure and passing the in-memory data structure to the runnable; the runnable options data including at least one command line flag or at least one environment variable or at least one data file or at least one string. An example 14 includes the subject matter of any of examples 11-13, where the instructions, when executed by the at least one processor, are capable of causing the at least one processor to perform operations further including reading the input data into an in-memory data structure configured according to a schema that is common across a plurality of execution environments. An example 15 includes the subject matter of any of examples 11-14, where the instructions, when executed by the at least one processor, are capable of causing the at least one processor to perform operations further including parsing the context data to determine an execution environment and executing the executable version of the configured runnable in the execution environment. An example 16 includes the subject matter of any of examples 11-15, where the instructions, when executed by the at least one processor, are capable of causing the at least one processor to perform operations further including passing the output to a second runner function to be used as input to the second runner function. An example 17 includes the subject matter of any of examples 11-16, where the instructions, when executed by the at least one processor, are capable of causing the at least one processor to perform operations further including comparing the output to output of a second runner function executed concurrently with the runner function; the runner function and the second runner function each executing different runnables. An example 18 includes the subject matter of any of examples 11-17, the runnable including a state-based decision diagram optimization solver, the input data including decision model data, and the output including a subset of the decision model data including at least one feasible route, or at least one feasible assignment, or at least one feasible schedule. An example 19 includes the subject matter of any of examples 11-18, the runnable including a state-based minimizer, or a state-based maximizer, or a state-based satisfier. An example 20 includes the subject matter of any of examples 11-19, the runnable including a simulator for a state-based decision diagram optimization solver, the input data including decision model testing data and the output including at least one performance indicator for the state-based decision diagram optimization solver based on the decision model testing data.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

Terms such as "computer-generated" and "computer-selected" as may be used herein may refer to a result of an execution of one or more computer program instructions by one or more processors of, for example, a server computer, a network of server computers, a client computer, or a combination of a client computer and a server computer.

As used here, "online" may refer to a particular characteristic of a connections network-based system. For example, many connections network-based systems are accessible to users via a connection to a public network, such as the Internet. However, certain operations may be performed while an "online" system is in an offline state. As such, reference to a system as an "online" system does not imply that such a system is always online or that the system needs to be online in order for the disclosed technologies to be operable.

As used herein the terms "include" and "comprise" (and variations of those terms, such as "including," "includes," "comprising," "comprises," "comprised" and the like) are intended to be inclusive and are not intended to exclude further features, components, integers or steps.

Various features of the disclosure have been described using process steps. The functionality/processing of a given process step potentially could be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features mentioned or evident from the text or drawings. These different combinations constitute various alternative aspects of the embodiments.

What is claimed is:

1. A computer-implemented method comprising:
    establishing a communicative coupling between a client program and a data source;

using the communicative coupling, by a runner function called by the client program, (i) reading, into an in-memory data structure, runnable options data passed by the client program to the runner function and passing the in-memory data structure to a runnable, (ii) configuring the runnable based on the runnable options data passed by the client program to the runner function, (iii) creating an executable binary version of the configured runnable based on context data associated with the client program, (iv) using input data read from the data source, creating a decision model and executing the executable binary version of the configured runnable using the decision model, and (v) writing output produced by the executing of the executable binary version of the configured runnable to the data source, wherein the executable binary version of the configured runnable comprises processor instructions;
the runnable comprising a decision diagram (DD)-based optimization function.

2. The computer-implemented method of claim 1, further comprising configuring the runner function based on runner options data passed by the client program to the runner function.

3. The computer-implemented method of claim 1, the runnable options data comprising at least one selected from the group consisting of: a command line flag, an environment variable, and a duration of a vehicle stop.

4. The computer-implemented method of claim 1, further comprising reading the input data into an in-memory data structure configured according to a schema that is common across a plurality of execution environments.

5. The computer-implemented method of claim 1, further comprising parsing the context data to determine an execution environment and executing the executable binary version of the configured runnable in the execution environment.

6. The computer-implemented method of claim 1, further comprising passing the output to a second runner function to be used as input to the second runner function.

7. The computer-implemented method of claim 1, further comprising comparing the output to output of a second runner function executed concurrently with the runner function; the runner function and the second runner functions executing different runnables.

8. The computer-implemented method of claim 1, the runnable comprising a state-based decision diagram optimization solver, the input data comprising decision model data, and the output comprising a subset of the decision model data comprising at least one feasible route.

9. The computer-implemented method of claim 1, the runnable comprising a state-based maximizer.

10. The computer-implemented method of claim 1, the runnable comprising a simulator for a state-based decision diagram optimization solver, the input data comprising decision model testing data and the output comprising at least one performance indicator for the state-based decision diagram optimization solver based on the decision model testing data.

11. A device, comprising:
at least one computer memory;
the at least one computer memory comprising instructions that, when executed by at least one processor, cause the at least one processor to perform operations comprising:
establishing a communicative coupling between a client program and a data source;
using the communicative coupling, by a runner function called by the client program, (i) reading, into an in-memory data structure, runnable options data passed by the client program to the runner function and passing the in-memory data structure to a runnable, (ii) configuring the runnable based on the runnable options data passed by the client program to the runner function, (iii) creating an executable binary version of the configured runnable based on context data associated with the client program, (iv) using input data read from the data source, creating a decision model and executing the executable binary version of the configured runnable using the decision model, and (v) writing output produced by the executing of the executable binary version of the configured runnable to the data source, wherein the executable binary version of the configured runnable comprises processor instructions;
the runnable comprising a decision diagram (DD)-based optimization function.

12. The device of claim 11, wherein the instructions, when executed by the at least one processor, cause the at least one processor to perform operations further comprising configuring the runner function based on runner options data passed by the client program to the runner function.

13. The device of claim 11, wherein the runnable options data comprising at least one selected from the group consisting of: a command line flag, an environment variable, and a duration of a vehicle stop.

14. The device of claim 11, wherein the instructions, when executed by the at least one processor, cause the at least one processor to perform operations further comprising reading the input data into an in-memory data structure configured according to a schema that is common across a plurality of execution environments.

15. The device of claim 11, wherein the instructions, when executed by the at least one processor, cause the at least one processor to perform operations further comprising parsing the context data to determine an execution environment and executing the executable binary version of the configured runnable in the execution environment.

16. The device of claim 11, wherein the instructions, when executed by the at least one processor, cause the at least one processor to perform operations further comprising passing the output to a second runner function to be used as input to the second runner function.

17. The device of claim 11, wherein the instructions, when executed by the at least one processor, cause the at least one processor to perform operations further comprising comparing the output to output of a second runner function executed concurrently with the runner function; the runner function and the second runner function each executing different runnables.

18. The device of claim 11, the runnable comprising a state-based decision diagram optimization solver, the input data comprising decision model data, and the output comprising a subset of the decision model data comprising at least one feasible route.

19. The device of claim 11, the runnable comprising a state-based maximizer.

20. The device of claim 11, the runnable comprising a simulator for a state-based decision diagram optimization solver, the input data comprising decision model testing data and the output comprising at least one performance indicator for the state-based decision diagram optimization solver based on the decision model testing data.

* * * * *